US008780100B2

(12) United States Patent
Arheit et al.

(10) Patent No.: US 8,780,100 B2
(45) Date of Patent: Jul. 15, 2014

(54) DISPLAY DEVICE, PARTICULARLY DISPLAY DEVICE FOR MOTOR VEHICLES, WITH A BRIGHTNESS SENSOR

(75) Inventors: Thomas Arheit, Weingarten (DE); Markus Loeffler, Remchingen (DE); Gerhard Kammerer, Koenigsbach (DE); Detlef Kuehn, Gaggenau (DE); Mike Duss, Marxzell (DE); Thomas Schmitz, Berg (DE)

(73) Assignee: Johnson Controls Technology Company, Holland, MI (US)

( * ) Notice: Subject to any disclaimer, the term of this patent is extended or adjusted under 35 U.S.C. 154(b) by 514 days.

(21) Appl. No.: 12/663,771

(22) PCT Filed: Jun. 11, 2008

(86) PCT No.: PCT/EP2008/004659
§ 371 (c)(1),
(2), (4) Date: Jul. 27, 2010

(87) PCT Pub. No.: WO2008/151782
PCT Pub. Date: Dec. 18, 2008

(65) Prior Publication Data
US 2010/0277451 A1  Nov. 4, 2010

(30) Foreign Application Priority Data
Jun. 11, 2007 (DE) .......................... 10 2007 027 353

(51) Int. Cl.
G09G 5/00 (2006.01)
G06F 3/038 (2013.01)

(52) U.S. Cl.
USPC .......................................... 345/207; 340/933

(58) Field of Classification Search
USPC ................. 345/207, 204, 76, 82, 60, 87, 101; 340/933; 361/748; 348/227.1
See application file for complete search history.

(56) References Cited

U.S. PATENT DOCUMENTS

| 5,487,123 | A | 1/1996 | Fowble |
| 5,815,623 | A | 9/1998 | Gilliland et al. |
| 6,369,395 | B1 | 4/2002 | Roessler |
| 6,867,751 | B1 | 3/2005 | Meldrum |
| 2003/0043589 | A1 | 3/2003 | Blank |
| 2005/0270175 | A1* | 12/2005 | Peddie et al. ................. 340/907 |
| 2006/0035410 | A1* | 2/2006 | Shiffer .......................... 438/111 |
| 2006/0214905 | A1* | 9/2006 | Okazaki ........................ 345/102 |
| 2007/0105439 | A1* | 5/2007 | Burris et al. .................. 439/578 |
| 2008/0001070 | A1 | 1/2008 | Nakamura et al. |

FOREIGN PATENT DOCUMENTS

| DE | 3821743 A1 | 1/1990 |
| DE | 3830695 A1 | 3/1990 |
| DE | 19713385 A1 | 10/1998 |
| DE | 10160296 A1 | 6/2003 |

(Continued)

OTHER PUBLICATIONS

Bivar, "Light Pipes," 1999, www.bivar.com/pdf/op12.pdf.

(Continued)

*Primary Examiner* — Stephen Sherman
(74) *Attorney, Agent, or Firm* — Fletcher Yoder, P.C.

(57) ABSTRACT

A display is disclosed, such as for a vehicle. A brightness sensor receives light from a flexible fiber-optic cable. An adapter element is provided proximate, such as between, the light output point of the optical fiber and the brightness sensor. The adapter element may be an angled piece, and may be extruded onto the optical cable.

10 Claims, 3 Drawing Sheets

(56) References Cited

FOREIGN PATENT DOCUMENTS

Figure 7:
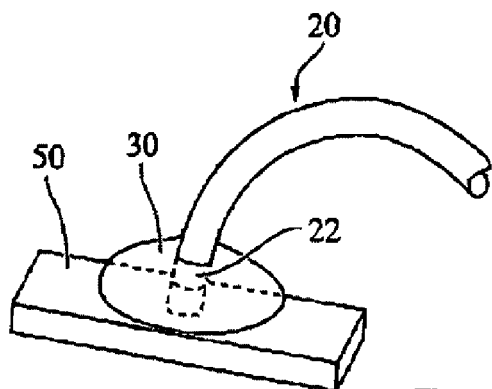

| EP | 0 847 896 A2 | 6/1998 |
| EP | 1 217 598 A2 | 6/2002 |
| EP | 1748307 A1 | 1/2007 |
| FR | 2 833 395 A1 | 6/2003 |

OTHER PUBLICATIONS

German Examination Report mailed Mar. 3, 2008.

International Search Report for application No. PCT/EP2008/004659 mailed Sep. 16, 2008.

* cited by examiner

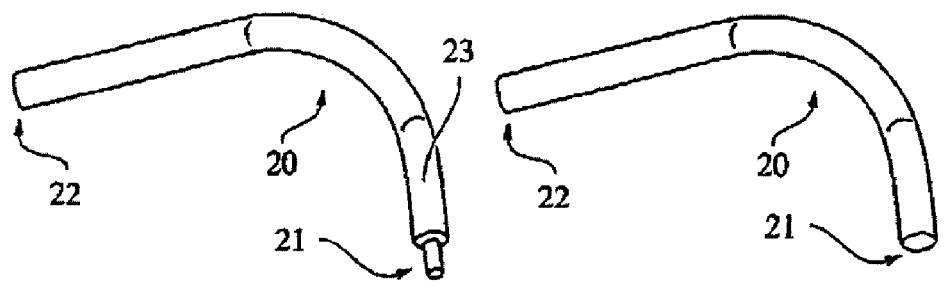
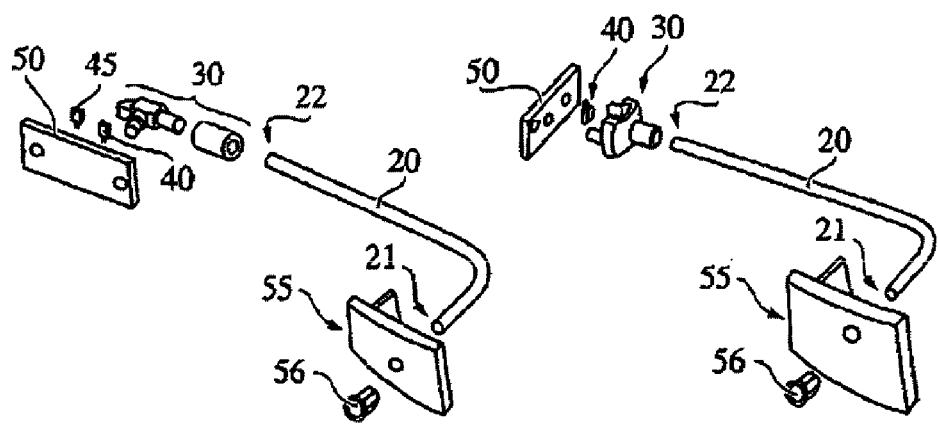
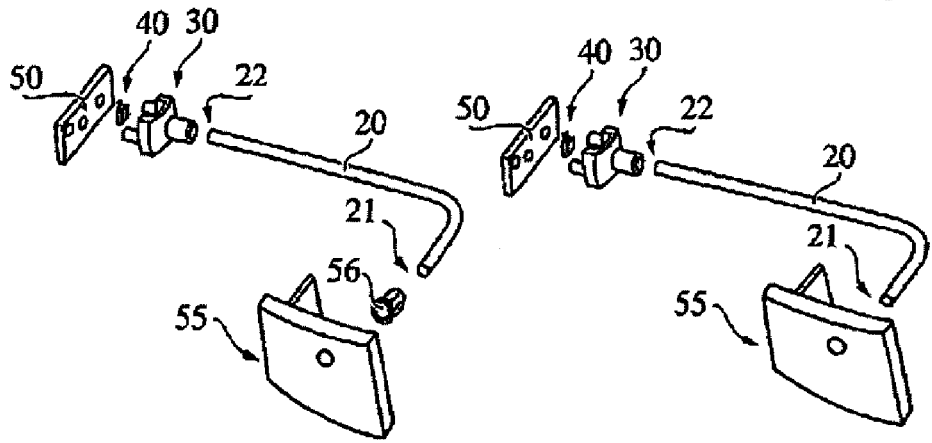

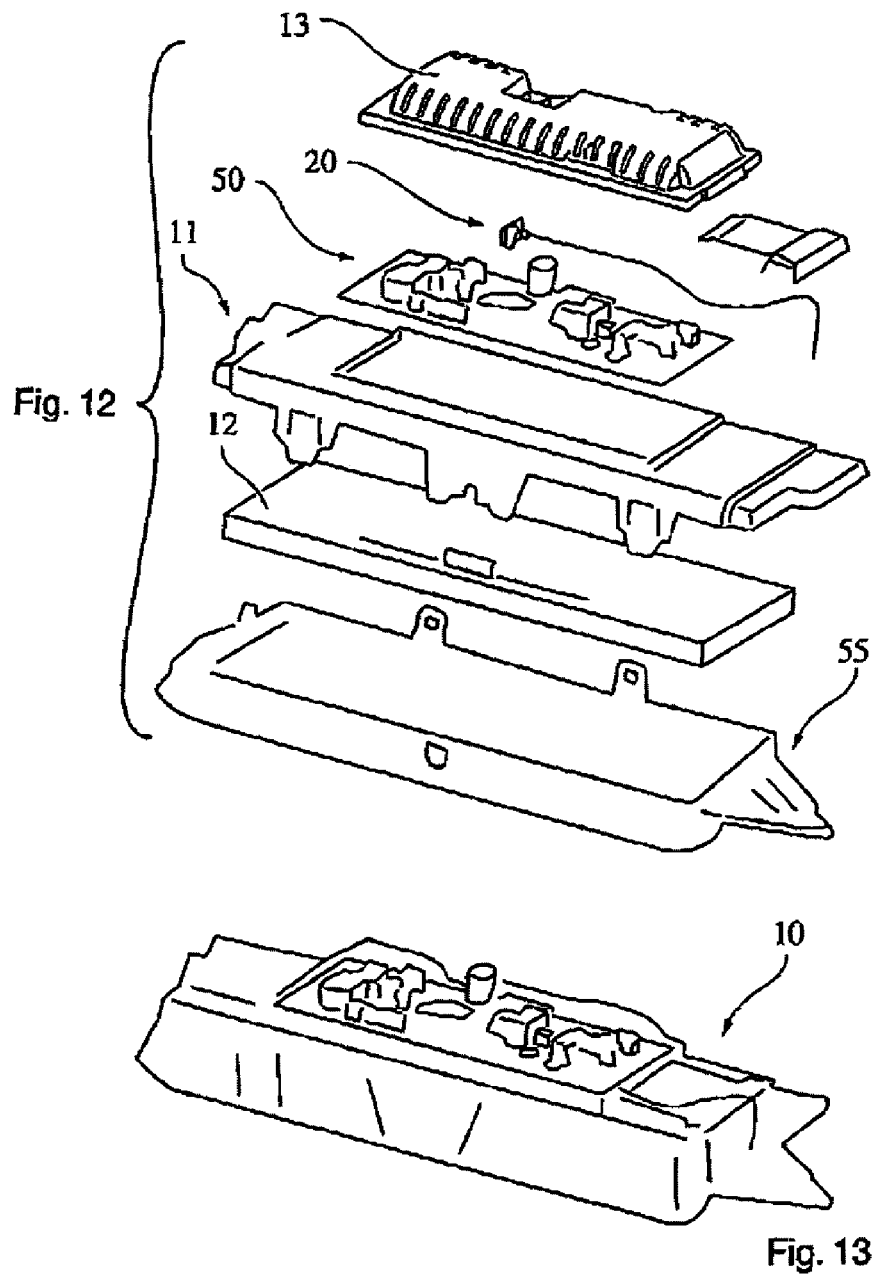

DISPLAY DEVICE, PARTICULARLY DISPLAY DEVICE FOR MOTOR VEHICLES, WITH A BRIGHTNESS SENSOR

CROSS REFERENCE TO RELATED APPLICATIONS

This application claims priority from and the benefit of PCT Application No. PCT/EP2008/004659, filed on Jun. 11, 2008 and German Patent DE 10 2007 027 353.5, filed on Jun. 11, 2007; all entitled "Display Device, Particularly Display Device for Motor Vehicles, with a Brightness Sensor", which are herein incorporated by reference.

BACKGROUND

The invention relates to a display device, particularly a vehicle display device, with a brightness sensor, the display device having a flexible fiber-optic cable that has a light input point and a light output point and is provided for inputting light into the brightness sensor.

Such display devices are generally known. In order to enable a brightness adaptation (dimming) for various display units such as combination instruments or displays, it is necessary to measure the ambient brightness. This is done, for example, using a light sensor or a phototransitor. For example, a display device having an optical conductor is disclosed in German laid-open patent application DE 101 60 296 A1, the optical conductor serving the purpose of ensuring a reliable optical connection of individual electrical components in the interior of the display device to a housing exterior. It is disadvantageous here that a substantial outlay is provided here for fastening the optical conductor. Furthermore, it is disadvantageous here that exchanging the front panel of the display device mostly entails exchanging the optical conductor or the fastening of the optical conductor.

SUMMARY

It is an object of the present invention to provide a display device, particularly a vehicle display device, with a brightness sensor and a flexible fiber-optic cable that does not have the disadvantages of the prior art and permits the provision of a display device that is cost effective and has a stable service life and can be produced with comparative ease and therefore cost effectively. Furthermore, the exchangeability of the front panel of the display device is to be ensured so that greater ease of repair is attained.

The object is achieved by a display device, particularly a vehicle display device, with a brightness sensor, the display device having a flexible fiber-optic cable that has a light input point and a light output point and is provided for inputting light into the brightness sensor, an adaptor element being provided in the region of the light output point and of the brightness sensor. The object is, furthermore, achieved by a display device with a brightness sensor and a flexible fiber-optic cable, the display device having a temperature sensor in the region of the brightness sensor, and the light input point of the fiber-optic cable being provided in a fashion held in its mounted position by intrinsic resilience. Owing to the adaptor element in the region of the light output point, it is advantageously possible according to the invention to fasten the fiber-optic cable on the display device in a secure and permanent manner with a comparatively low outlay. Alternatively or in addition thereto, it is further advantageously possible, even given large tolerances with regard to the behavior of the light sensor or brightness sensor and, in particular, given a strong temperature dependence of the brightness sensor, to be able, nevertheless, to measure the light accurately or determine the brightness accurately and to react with corresponding accuracy to the existing ambient brightness of the display device owing to the arrangement of the temperature sensor in the region of the brightness sensor. Furthermore, it is advantageously possible alternatively or in addition, with regard both to the adaptor element and to the temperature sensor to balance temperature induced dimensional changes, for example, with a low outlay, and to ensure the front plate or panel of the display device can be exchanged easily and cost effectively, through the positioning of the light output point by intrinsic resilience.

According to the invention, it is preferably provided that the display device has a printed circuit board for the electrical connection of the brightness sensor and/or of the temperature sensor. It is advantageously possible to be able, on the one hand, to arrange the temperature sensor and/or the brightness sensor in a protected fashion on the printed circuit board and, on the other hand, to make contact with them electrically and/or mount them in a simpler and comparatively more cost effective way by means of the printed circuit board. By comparison with a design of the display device with a separate printed circuit board in the region of the front panel of the display device, the result is thus substantial cost advantages and, furthermore, also advantages in mounting and/or with respect to the reparability of the display device and/or the ease with which the front plate or front panel of the display device can be exchanged.

It is, furthermore, preferred when the adaptor element is provided as an angled piece and/or when the adaptor element is provided in a fashion integrally extruded onto the fiber-optic cable. The fiber-optic cable and the brightness sensor can hereby be connected and/or linked to one another in a simple and reliable way in terms of production engineering.

The further preferred measure that the fiber-optic cable is provided in a fashion coated at least partially with a light-opaque material between the light input point and the light output point has the advantage that there is no risk of an inadvertent optical input of light or, furthermore, that owing to a comparatively small diameter (of one millimeter, for example) of the actual optical conductor material present in the interior of the light-opaque material of the coating, such a fiber-optic cable is prescribed a comparatively small minimum bending radius (of approximately 9 millimeters, for example) such that such a fiber-optic cable can also, moreover, be laid and/or inserted with particular flexibility. However, it is likewise possible in accordance with the invention to design the fiber-optic cable without a coating, it being advantageous here that a comparatively large diameter of the actual optical conductor material produces a very good and/or efficient transfer of light inside the optical conductor.

It is preferred, furthermore, in accordance with the invention that the light input point is provided in the region of the outside of a cover of the display device, or in the region of the outside of a panel of the display device, and/or that an optical conductor, in particular a lens, is provided between the light input point and the outside of a cover of the display device or a panel of the display device. It is advantageously possible hereby according to the invention that, on the one hand, a good functionality is ensured in the sensing of the ambient brightness of the display device, in particular through a good light crossover from the exterior of the display device via the light input point into the fiber-optic cable and that, on the other hand, the exterior of the display device nevertheless particularly satisfies aesthetic demands.

Furthermore, it is preferred according to the invention when an insertion aid for the light input point of the fiber-optic cable is provided in the region of the inside of a cover of the display device, in the region of the inside of a panel of the display device, the insertion aid preferably being of funnel-shaped design. Mounting of the display device can hereby be carried out in a particularly simple way, and it is possible, moreover, for the panel and/or the cover of the display device to be configured to be exchangeable in a particularly simple way.

DRAWINGS

Exemplary embodiments of the invention are illustrated in the drawing and explained in more detail in the following description. In the drawing:

FIGS. 1 and 2 show two embodiments of a fiber-optic cable used in an inventive display device, FIGS. 3-6 show, by means of exploded illustrations, various embodiments of the basic design of the light guidance from the exterior of the panel or the cover of an inventive display device up to a brightness sensor, FIGS. 7-11 show detailed illustrations of various embodiments of the design of the inventive display device in the region of the light output point and in the region of the light input point, respectively, and FIGS. 12-13 show an exploded illustration and a perspective view of an embodiment of the inventive display device.

DETAILED DESCRIPTION

FIGS. 1 and 2 respectively illustrate a fiber-optic cable 20 for use in a display device 10 shown in FIG. 12 in a perspective exploded illustration, and in FIG. 13 in a perspective illustration. According to the invention, the display device 10 can be, for example, a combination instrument—in particular in a motor vehicle, aircraft or watercraft or the like—or else some other display device, for example in a center console of a vehicle. In accordance with the exemplary embodiment of FIG. 12, the display device 10 here has the fiber-optic cable 20 and an (external) panel 55 or an (external) cover 55 as well as, in particular, a printed circuit board 50, a support element 11, a display element 12 and a rear part 13. Both in accordance with FIG. 1 and in accordance with FIG. 2, the fiber-optic cable 20 has a light input point 21 and a light output point 22. The fiber-optic cable 20 is provided in accordance with the invention as a flexible fiber-optic cable 20 and is also denoted below as a so-called flexible conductor 20. By contrast with the exemplary embodiment of the flexible conductor 20 in accordance with FIG. 2, the flexible conductor 20 in accordance with FIG. 1 is provided in a fashion coated, by means of a coating 23, at least in subregions between the light input point 21 and the light output point 22.

As emerges from FIGS. 3 to 7, in the state installed in the display device 10 the light input point 21 is preferably provided in the region of the panel 55 or the cover 55. Furthermore, an opening, not marked by a reference numeral, in the panel 55 or the cover 55, as well as a optical conductor 56 in the form of a lens in the embodiments in accordance with FIGS. 3 to 5, are provided in the region of the light input point 21. In the embodiment in accordance with FIG. 6, the light input point 21 is provided in a fashion plugged through the opening in the panel 55 or the cover 55. In the state installed in the display device 10, the light output point 22 is preferably provided in the region of the printed circuit board 50. Provided in the region of the light output point 22, furthermore, is a brightness sensor 40, an adaptor element 30 and, if appropriate, a temperature sensor 45 (depicted only in FIG. 3, but also possible in principle in the embodiments in accordance with FIGS. 4 to 6). In the embodiment in accordance with FIG. 3, the adaptor element 30 is provided as an angled piece with an adaptor, and in the embodiment in accordance with FIGS. 4 to 6 it is provided as an adaptor housing. In both cases, the adaptor element 30 can be provided, by means of a plastics injection molding process, in a fashion integrally extruded onto the flexible conductor 20 in the region of the light output point 22.

Figure 8:
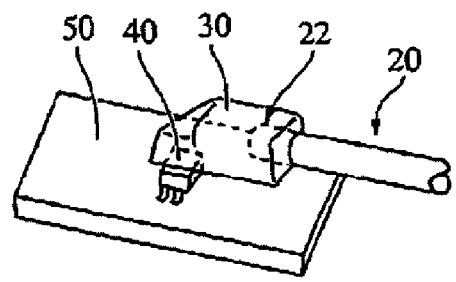
Figure 9:
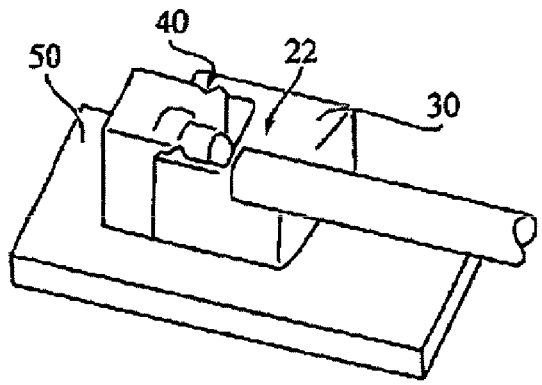
Figures 10, 11:
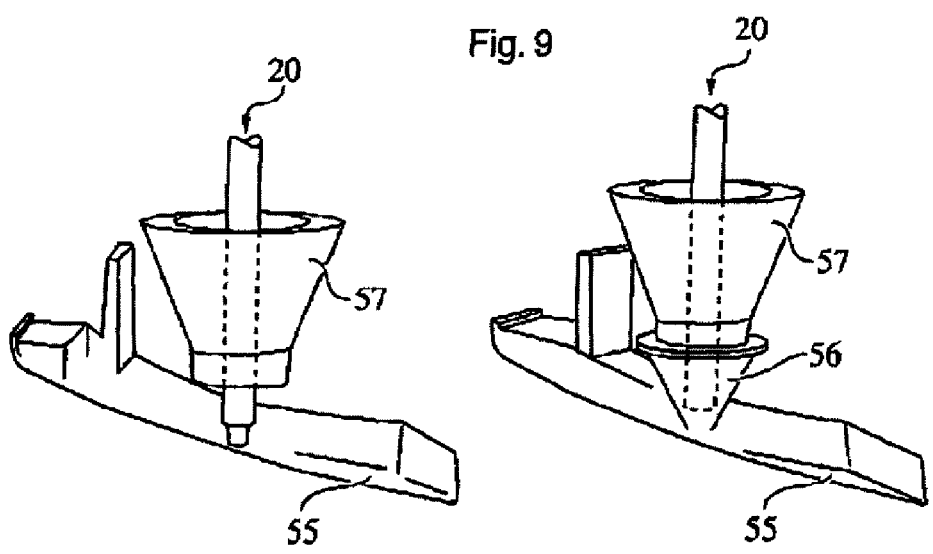

Detailed illustrations of three embodiments of the design of the inventive display device 10 in the region of the light output point 22 are illustrated in FIGS. 7 to 9. In the embodiment in accordance with FIG. 7, the adaptor element 30 is provided here in the form of an adaptor housing integrally extruded onto the flexible conductor 20, and the mounting of this arrangement is preferably performed here by pressing the adaptor housing into the printed circuit board 50. As an alternative hereto, it is also possible to provide that the adaptor housing is pressed into the printed circuit board 50, and that the flexible conductor 20 is plugged into the adaptor housing, the holding force for the flexible conductor 20 being produced by clamping in the adaptor housing or by holding down the rear part 13 (compare FIG. 12). In the embodiment in accordance with FIG. 8, the adaptor element 30 is provided in the form of an angled piece in a fashion integrally extruded onto the flexible conductor 20, and the mounting of this arrangement is preferably performed by pressing into the printed circuit board 50, as an alternative hereto by means of connecting the angled piece to the flexible conductor 20 via an adaptor, as well as pressing this arrangement into the printed circuit board 50 such that such an adaptor together with the angled piece constitutes the adaptor element 30. In the embodiment in accordance with FIG. 9, the adaptor element 30 is provided in such a way that both the brightness sensor 40 (in particular as a wired brightness sensor), and the flexible conductor 20 is extruded with the plastics housing of the adaptor element 30, mounting on the printed circuit board being performed by soldering, for example. In this or a similar embodiment, it is possible in accordance with the invention to design the brightness sensor 40 as a laterally emitting so-called side LED. As an alternative to extruding both the flexible conductor 20 and the brightness sensor 40, it can also be provided that only the flexible conductor 20 or the brightness sensor 40, or neither of the two, is provided in an extruded fashion, and that a connection is provided by means of a clip connection, for example the flexible conductor 20 is clipped into the adaptor housing of the adaptor element 30, and/or the adaptor element 30 is clipped to a housing of the brightness sensor 30. FIGS. 10 and 11 show detailed illustrations of two embodiments of the design of the inventive display device 10 in the region of the light input point 21, the flexible conductor 20 being provided, in accordance with the embodiment of FIG. 10, in a fashion positioned directly into the cover 55 or the panel 55 by means of an insertion aid 57, and the flexible conductor 20 being provided, in accordance with the embodiment of FIG. 11, in a fashion positioned over an optical conductor 56, particularly in the form of a lens, in the cover 55 or the panel 55 of the display device 10, likewise by means of an insertion aid 57. In particular, it is provided both in the case of the embodiment in accordance with FIG. 10 and in accordance with FIG. 11, that the flexible conductor 20 is pressed against the cover 55 or against the optical conductor 56 by intrinsic resilience—produced by bending, for example.

The invention claimed is:

1. A display device for a vehicle, comprising:
   a brightness sensor;
   a temperature sensor disposed proximate to the brightness sensor and configured to detect a temperature, wherein the temperature is used to adjust a measurement of the brightness sensor;
   a printed circuit board having the brightness sensor and the temperature sensor electrically coupled thereto;
   a flexible fiber-optic cable comprising a light input point and a light output point, wherein the fiber-optic cable is configured to direct light into the brightness sensor; and
   an adaptor element disposed proximate to the light output point and the brightness sensor, and coupled to the printed circuit board, wherein the adaptor element is extruded via an injection molding process onto the fiber-optic cable to establish an integral bond.

2. The display device as claimed in claim 1, wherein the light input point of the fiber-optic cable is held in its mounted position by intrinsic resilience.

3. The display device as claimed in claim 1, wherein the adaptor element comprises an angled piece.

4. The display device as claimed in claim 1, wherein the fiber-optic cable is coated at least partially with a light-opaque material between the light input point and the light output point.

5. The display device as claimed in claim 1, wherein the light input point is proximate to an outside of a cover of the display device, or proximate to an outside of a panel of the display device.

6. The display device as claimed in claim 1, wherein an optical conductor is provided between the light input point and an outside of a cover of the display device or a panel of the display device.

7. The display device in claim 6, wherein the optical conductor comprises a lens.

8. The display device as claimed in claim 1, wherein an insertion aid for the light input point of the fiber-optic cable is provided proximate to an inside of a cover of the display device or proximate to an inside of a panel of the display device.

9. The display device in claim 8, wherein the insertion aid comprises a funnel-shaped surface.

10. The display device of claim 1, wherein the adaptor element is configured to be coupled to the printed circuit board by pressing the adaptor element into the printed circuit board.

* * * * *